United States Patent
Kikuchi et al.

(10) Patent No.: US 8,151,915 B2
(45) Date of Patent: Apr. 10, 2012

(54) ELECTRIC DRIVE VEHICLE

(75) Inventors: Akira Kikuchi, Hitachi (JP); Keizo Shimada, Hitachi (JP); Kichio Nakajima, Kasumigaura (JP); Toshikazu Minoshima, Kasumigaura (JP); Tomohiko Yasuda, Kashiwa (JP); Takashi Ikimi, Hitachi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 506 days.

(21) Appl. No.: 12/388,596

(22) Filed: Feb. 19, 2009

(65) Prior Publication Data

US 2009/0242294 A1   Oct. 1, 2009

(30) Foreign Application Priority Data

Mar. 31, 2008   (JP) .................................. 2008-089167

(51) Int. Cl.
*G01M 17/00* (2006.01)
(52) U.S. Cl. ........................ 180/65.21; 903/930; 701/29
(58) Field of Classification Search ............... 180/65.21, 180/65.285, 65.31; 903/930; 701/22, 29, 701/99
See application file for complete search history.

(56) References Cited

U.S. PATENT DOCUMENTS

| 6,834,541 B2 * | 12/2004 | Nakanishi et al. ......... 73/116.06 |
| 7,558,655 B2 * | 7/2009 | Garg et al. ....................... 701/29 |
| 7,626,395 B2 * | 12/2009 | Kanamori ...................... 324/503 |

FOREIGN PATENT DOCUMENTS

| JP | U 54-43513 | 3/1979 |
| JP | 2001-91410 | 4/2001 |
| JP | 2006-166684 | 6/2006 |
| JP | 2006-197705 | 7/2006 |
| JP | 2006-230084 | 8/2006 |
| JP | 2007-129823 | 5/2007 |
| JP | 2007-259611 | 10/2007 |
| JP | 2008-11609 | 1/2008 |
| JP | 2008-187794 | 8/2008 |

* cited by examiner

*Primary Examiner* — John Walters
(74) *Attorney, Agent, or Firm* — Antonelli, Terry, Stout & Kraus, LLP.

(57) ABSTRACT

An electric drive vehicle having a power generator coupled to an engine, a first power converter connected with the power generator for converting the AC power generated by the power generator to DC power, a second power converter connected with the first power converter, for converting the DC power to AC power, a power consuming device for consuming the DC power, connected to a DC circuit between the first and second power converters, an electric motor connected with the second power converter, and at least one wheel driven by the electric motor, wherein the vehicle has a first control mode for controlling the output of the electric motor and a second control mode for controlling the power consumed by the power consuming device, and the second control mode performs such control that the operations of the second power converter and the electric motor in the first control mode are simulated.

12 Claims, 9 Drawing Sheets

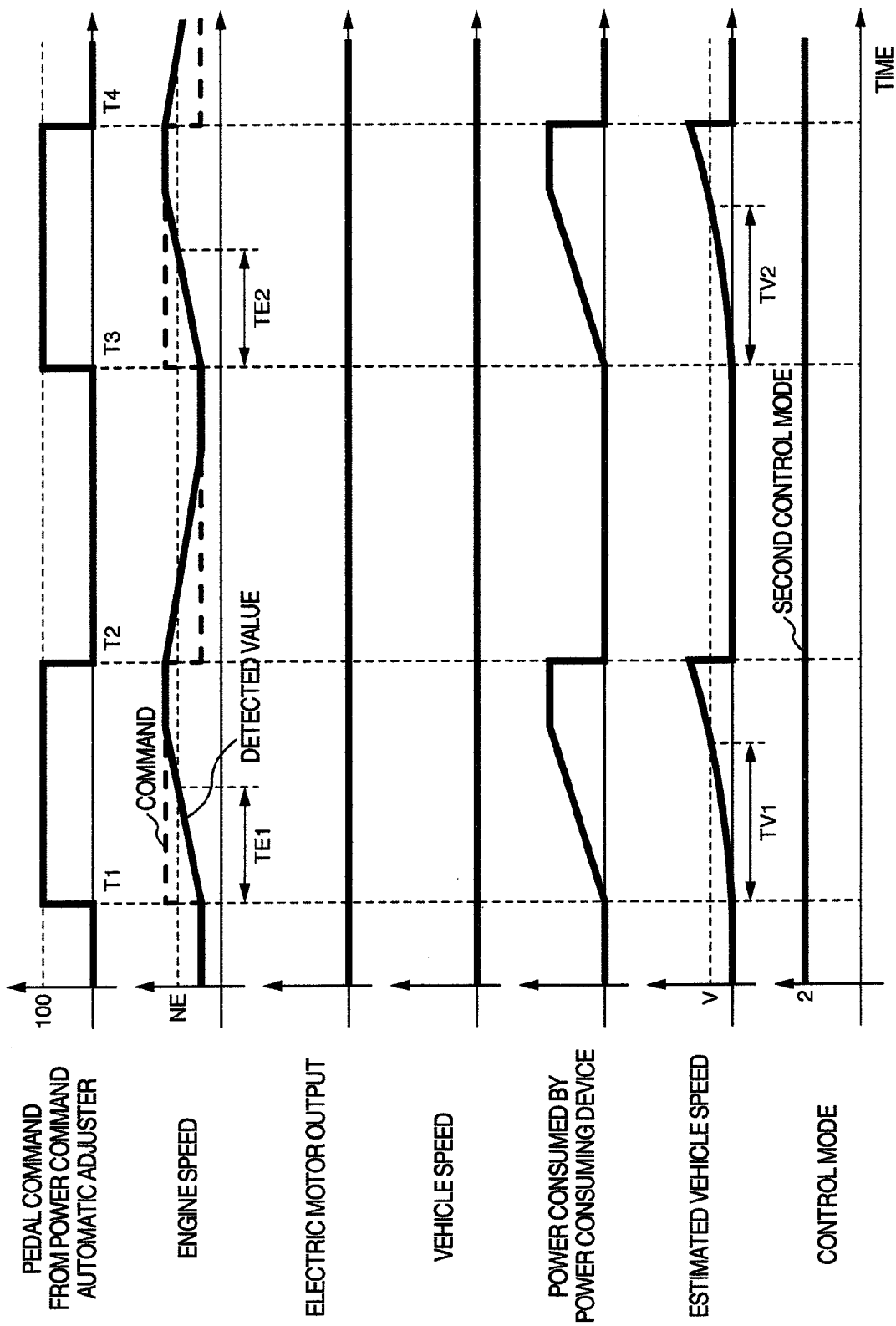

ELECTRIC DRIVE VEHICLE

BACKGROUND OF THE INVENTION

This invention relates to an electrically driven vehicle, and more particularly to an electrically driven vehicle (hereafter referred to as "electric drive vehicle") whose running performance can be easily measured.

In the test in which the running performance of a conventional electric drive vehicle is measured, an electric motor for driving the wheels of the electric drive vehicle is coupled mechanically to a dynamometer, or the vehicle is driven on a chassis dynamometer. Or alternatively, the electric drive vehicle is actually driven on a test drive course to measure the running performance. Such a test procedure for an electric drive vehicle is disclosed in, for example, JP-A-2001-91410.

SUMMARY OF THE INVENTION

Such a test procedure, however, needs a dynamometer, a chassis dynamometer, or a test drive course, that is, a test facility in addition to a test vehicle. Thus, the test facility gave rise to extra costs. Moreover, to actually drive the vehicle, there is need for some preparatory work that leads to the prolongation of the entire test period. This has caused a problem.

In the test procedure for measuring the vibratory characteristic of a motor or a vehicle, it is necessary to actually rotate the motor or to drive the vehicle, as described above. Depending on the purpose of test, however, it is not necessarily required to rotate the motor or to drive the vehicle. For example, in order to obtain the output characteristic of an engine for use in an electric drive vehicle that drives by using the engine output as driving source, the characteristic can be measured simply by imposing load on the engine. Therefore, it is not necessarily required to rotate the motor or to drive the vehicle so as to impose load on the engine. Namely, according to the conventional test procedure, the motor was rotated and the vehicle was driven even in the case where there is no need for rotating the motor or driving the vehicle.

As described above, the conventional test procedure for electric drive vehicles cannot be free from a problem that much cost will be incurred and much time will be spent. The purpose of this invention is to provide an electric drive vehicle which needs no test facility and can also shorten the test period by performing a test without resorting to actual vehicle drive.

According to this invention, which has been made to solve the above mentioned problem, there is provided an electric drive vehicle comprising a power generator coupled to the engine; a first power converter connected with the power generator, for converting the AC power generated by the power generator to the corresponding DC power; a second power converter connected with the first power converter, for converting the DC power to the corresponding AC power; an electric motor connected with the second power converter; and wheels driven by the electric motor, wherein a power consuming device for consuming the DC power is connected in the DC circuit between the first and second power converters; a first control mode in which the electric drive vehicle is driven by controlling the output of the electric motor and a second control mode in which the power consumption by the power consuming device is controlled, are provided; and the second control mode performs such control as to cause the power consuming device to consume the amount of power that corresponds to the power consumed by both the second power converter and the electric motor in the first control mode.

Also, according to this invention, there is provided an electric drive vehicle comprising a power generator coupled to the engine; a first power converter connected with the power generator, for converting the AC power generated by the power generator to the corresponding DC power; a second power converter connected with the first power converter, for converting the DC power to the corresponding AC power; an electric motor connected with the second power converter; and wheels driven by the electric motor, wherein a power consuming device for consuming the DC power is connected in the DC circuit between the first and second power converters; a power command calculator is further provided; a first control mode in which the electric drive vehicle is driven by controlling the output of the electric motor in accordance with the power command delivered from the power command calculator and a second control mode in which the power consumption by the power consuming device is controlled in accordance with the power command, are provided; and the second control mode performs such control as to cause the power consuming device to consume the amount of power that corresponds to the power consumed by both the second power converter and the electric motor in the first control mode.

The amount of power consumed by both the second power converter and the electric motor is meant as at least one of the power output of the second power converter and the power consumed by the electric motor.

Further, according to this invention, there is provided an electric drive vehicle comprising a power generator coupled to the engine; a first power converter connected with the power generator, for converting the AC power generated by the power generator to the corresponding DC power; a second power converter connected with the first power converter, for converting the DC power to the corresponding AC power; an electric motor connected with the second power converter; and wheels driven by the electric motor, wherein a power consuming device for consuming the DC power is connected in the DC circuit between the first and second power converters; a first control mode for controlling the output of the electric motor and a second control mode for controlling the power consumption by the power consuming device, are provided; and the second control mode controls the power consumption by the power consuming device in such a manner that the operations of the second power converter and the electric motor in the first control mode are simulated.

Still further, according to this invention, there is provided an electric drive vehicle comprising a power generator coupled to the engine; a first power converter connected with the power generator, for converting the AC power generated by the power generator to the corresponding DC power; a second power converter connected with the first power converter, for converting the DC power to the corresponding AC power; an electric motor connected with the second power converter; and wheels driven by the electric motor, wherein a power consuming device for consuming the DC power is connected in the DC circuit between the first and second power converters; a power command calculator is further provided; a first control mode for controlling the output of the electric motor in accordance with the power command from the power command calculator and a second control mode for controlling the power consumption by the power consuming device in accordance with the power command, are provided; and the second control mode controls the power consumption by the power consuming device in such a manner that the operations of the second power converter and the electric motor in the first control mode are simulated.

Yet further, according to this invention, there is provided an electric drive vehicle wherein the power command from the power command calculator at the time of vehicle acceleration is represented as a function of the rotational speed of the engine and the engine rotational speed command.

Furthermore, according to this invention, there is provided an electric drive vehicle wherein the electric drive vehicle is at a halt while the second control mode is at work.

In addition, according to this invention, there is provided an electric drive vehicle wherein a vehicle speed estimator is further provided; the vehicle speed estimator operates while the electric drive vehicle is in the second control mode; and the vehicle speed in the case where the vehicle virtually operates in the first control mode is estimated by using the power command delivered from the power command calculator.

Still in addition, according to this invention, there is provided an electric drive vehicle wherein a vehicle speed estimator is further provided; the vehicle speed estimator operates while the electric drive vehicle is operating in the second control mode; and the vehicle speed in the case where the vehicle virtually operates in the first control mode, is estimated.

Yet in addition, according to this invention, there is provided an electric drive vehicle wherein the power command calculator automatically adjusts the power command in such a manner that while the vehicle is operating in the second control mode, each of the time required for the engine rotational speed to reach a predetermined value and the time required for the vehicle speed estimated by the vehicle speed estimator to reach a predetermined value, falls within a predetermined range.

In order to attain the above mentioned object, this invention provides a system for driving an electric drive vehicle comprising an electric generator coupled to the engine; a first power converter connected with the electric generator, for converting the AC power generated by the electric generator to the corresponding DC power; a second power converter connected with the first power converter, for converting the DC power to the corresponding DC power; and an electric motor connected with the second power converter, characterized in that a power consuming device for consuming the DC power is connected in the DC circuit between the first and second power converters, and that the function of performing a load test on the engine by adjusting the power consumed by the power consuming device, is provided.

According to this invention, there is no need for test facility including a dynamometer or a chassis dynamometer, or a test drive course for the measurement of vehicle running performance, and therefore the cost and the test period can be reduced.

In addition, since the running performance can be measured while the vehicle is at rest, the efficiency in performance test can be improved as a result of being able to shorten the test period.

It is also possible to automatically adjust the running performance so that the accelerations of both the engine and the electric motor can be compatible with each other at the time of starting the vehicle.

Moreover, since adjustment is easy even when the engine characteristic varies due to the influences of the change in the ambient conditions such as atmospheric temperature and pressure or aging, periodical adjustments can assure the best setting.

Other objects, features and advantages of the invention will become apparent from the following description of the embodiments of the invention taken in conjunction with the accompanying drawings.

BRIEF DESCRIPTION OF THE DRAWINGS

FIG. 9 graphically shows the operation of the electric drive vehicle to which this invention is applied, observed in the second control mode performed in the second embodiment of this invention.

DESCRIPTION OF THE EMBODIMENTS

Figure 1:
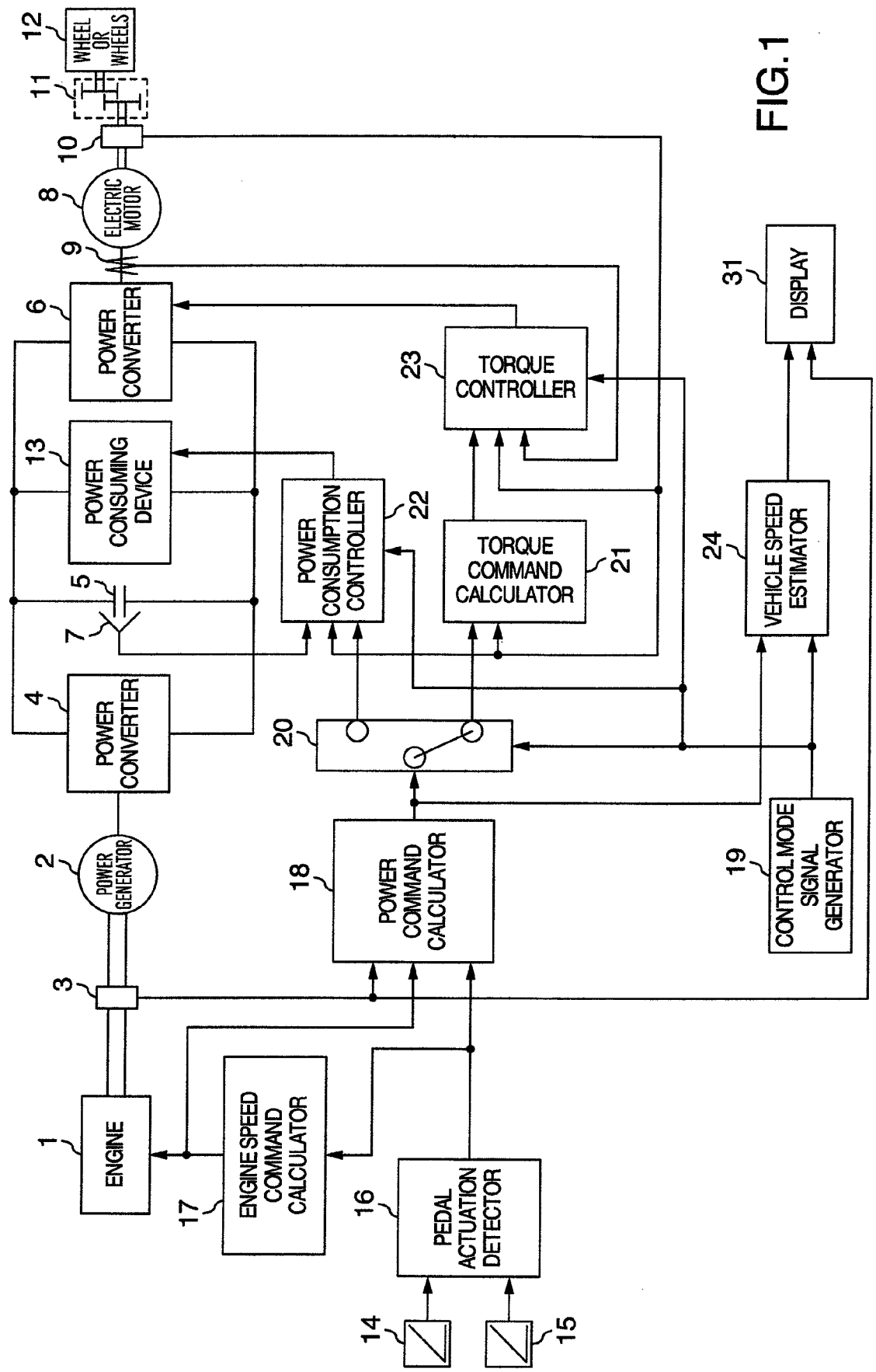
FIG. 1 shows in block diagram the configuration of an electric drive vehicle as a first embodiment of this invention.

A first embodiment of this invention will now be described in reference to the attached drawings. FIG. 1 shows in block diagram the configuration of an electric drive vehicle as a first embodiment of this invention.

As shown in FIG. 1, when an engine 1 drives an electric generator 2, the electric generator 2 generates AC power. A speed detector 3 is coupled to the engine 1 so as to detect the rotational speed (hereafter referred to simply as "speed") of the engine 1.

The generator 2 is connected with a power converter 4, which delivers a DC output by converting the AC power delivered from the generator 2 to the corresponding DC power.

The power converter 4 is connected via a smoothing capacitor 5 with a power converter 6, which delivers an AC output by converting the DC power delivered from the power converter 4 to the corresponding AC power. A DC voltage detector 7 is connected in the DC circuit between the power converters 4 and 6, and the DC voltage detector 7 detects the DC voltage across the DC circuit.

The power converter 6 is connected with an electric motor 8 and drives it. A current detector 9 is provided between the power converter 6 and the electric motor 8 so as to detect the current flowing between the power converter 6 and the electric motor 8. A speed detector 10 is coupled to the electric motor 8 so as to detect the rotational speed (hereafter referred to simply as "speed") of the motor 8.

The electric motor 8 is coupled to the wheels 12 of the vehicle via transmission gear 11. The vehicle is accelerated forward or backward by driving the wheels 12 by the electric motor 8. The electric motor 8 may drive one of the wheels 12 of the vehicle.

When the vehicle is decelerated, the electric motor 8 functions as a generator for converting the mechanical energy of the moving vehicle to the corresponding electric energy, that is, the electric motor 8 regenerates AC power as its output. The power converter 6 converts the AC power delivered from the electric motor 8 to the corresponding DC power and delivers it. A power consuming device 13 is connected in the DC circuit between the power converters 4 and 6, and the vehicle can be decelerated by causing the power consuming device 13 to consume the DC power delivered from the power converter 6.

An accelerator pedal depress range detector 14 detects the depth of the accelerator pedal depressed in response to the accelerator pedal actuation by the operator, whereas a brake pedal depress range detector 15 detects the depth of the brake pedal depressed in response to the brake pedal actuation by the operator.

A pedal actuation detector 16 receives input signals representing the detected value of accelerator pedal depth delivered from the accelerator pedal depress range detector 14 and the detected value of brake pedal depth delivered from the brake pedal depress range detector 15, and outputs a operator pedal command.

An engine speed command calculator 17 receives an input signal representing the pedal command delivered from the pedal actuation detector 16, and outputs an engine speed command to the engine 1. The engine 1 operates in accordance with the engine speed command delivered from the engine speed command calculator 17.

A power command calculator 18 receives an input signal representing the detected value of engine speed delivered from the engine speed detector 3, the engine speed command delivered from the engine speed command calculator 17 and the pedal command delivered from the pedal actuation detector 16, and outputs a power command for the electric motor 8 or the power consuming device 13.

A control mode signal generator 19 outputs a control mode signal for commanding the vehicle to be driven in appropriate control modes in accordance with the operator's manipulation. There are two control modes available here. The first of the two modes is to control the output of the electric motor 8 in accordance with the power command delivered from the power command calculator 18, whereas the second mode is to control the power consumed by the power consuming device 13 in accordance with the power command delivered from the power command calculator 18. In the second control mode, the power consumed by the power consuming device 13 is so controlled that the operations of the power converter 6 and the electric motor 8 in the first control mode are simulated. Accordingly, the power consuming device 13 has both the function of consuming the power regenerated by the electric motor 8 when the vehicle is decelerating, and the function of consuming electric power in such a manner that the operations of the power converter 6 and the electric motor 8 when the vehicle is accelerating are simulated.

A changeover switch 20 receives input signals representing the power command from the power command calculator 18 and the control mode signal from the control mode signal generator 19, and causes the power command from the power command calculator 18 to be directed to a torque command calculator 21 when the control mode signal represents the first control mode and to a power consumption controller 22 when the control mode signal represents the second control mode.

The torque command calculator 21 receives input signals representing the power command from the changeover switch 20 and the detected value of motor speed from the motor speed detector 10, converts the power command to the corresponding torque command, and outputs the torque command.

A torque controller 23 receives input signals representing the torque command delivered from the torque command calculator 21, the detected current value delivered from the current detector 9, the detected value of motor speed delivered from the motor speed detector 10 and the control mode signal delivered from the control mode signal generator 19, and delivers a gate pulse signal to the power converter 6 through PWM control in such a manner that the torque output of the electric motor 8 coincides with the torque command delivered from the torque command calculator 21. If the control mode signal delivered from the control mode signal generator 19 represents the second control mode, the gate pulse signal is not delivered to stop the operation of the power converter 6. The power converter 6 receives the gate pulse signal from the torque controller 23 and realizes a high-responsive torque control through the high-speed switching of switching elements such as IGBTs.

The power consumption controller 22 receives input signals representing the detected value of DC voltage delivered from the DC voltage detector 7, the detected value of motor speed delivered from the motor speed detector 10, the power command from the changeover switch 20 and the control mode signal delivered from the control mode signal generator 19, and causes the gate pulse signal to be directed to the power consuming device 13 through PWM control in such a manner that the DC voltage across the DC circuit between the power converters 4 and 6 does not exceed a predetermined value in the first control mode, and that the power consumed by the power consuming device 13 coincides with the power command from the changeover switch 20 in the second control mode. The power consuming device 13 receives the gate pulse signal from the power consumption controller 22, and realizes, by the help of the high-speed switching of switching elements such as IGBTs, a high-responsive DC voltage control in the first control mode and a high-responsive power control in the second control mode.

A vehicle speed estimator 24 receives input signals representing the power command from the power command calculator 18 and the control mode signal from the control mode signal generator 19, operates when the control mode signal represents the second control mode, estimates the speed of the vehicle being virtually operated in the first control mode, and outputs the estimated value of vehicle speed. At this time, the vehicle speed estimator 24 makes estimation by using assumed parameters such as vehicle weight, road inclination, road frictional resistance, etc. When the control mode signal represents the first control mode, the vehicle speed estimator 24 does not operate and therefore delivers a zero output.

A display 31 receives and displays the estimated value of vehicle speed delivered from the vehicle speed estimator 24 and the detected value of engine speed delivered from the engine speed detector 3.

The operation of the pedal actuation detector 16 will now be described. The pedal actuation detector 16 outputs the detected depth of the accelerator pedal depress delivered from the accelerator pedal depress range detector 14, as it is, while the operator is actuating the accelerator pedal. While the operator is actuating the brake pedal, the pedal actuation detector 16 inverts the polarity of and outputs, the detected depth of the brake pedal depress delivered from the brake pedal depress range detector 15. For example, when the operator depresses the accelerator pedal halfway of the full depress stroke, the accelerator pedal depress range detector 14 outputs the depth signal representing 50% of the full depress stroke so that the pedal actuation detector 16 outputs the pedal command of 50%. When the operator depresses the brake pedal halfway of the full depress stroke, the brake pedal depress range detector 15 outputs the depth signal representing 50% of the full depress stroke so that the pedal actuation detector 16 outputs the pedal command of −50%. It should here be noted that if both the accelerator pedal and the brake pedal are actuated simultaneously, the brake pedal actuation is prioritized and the corresponding pedal command is delivered.

Figure 2:
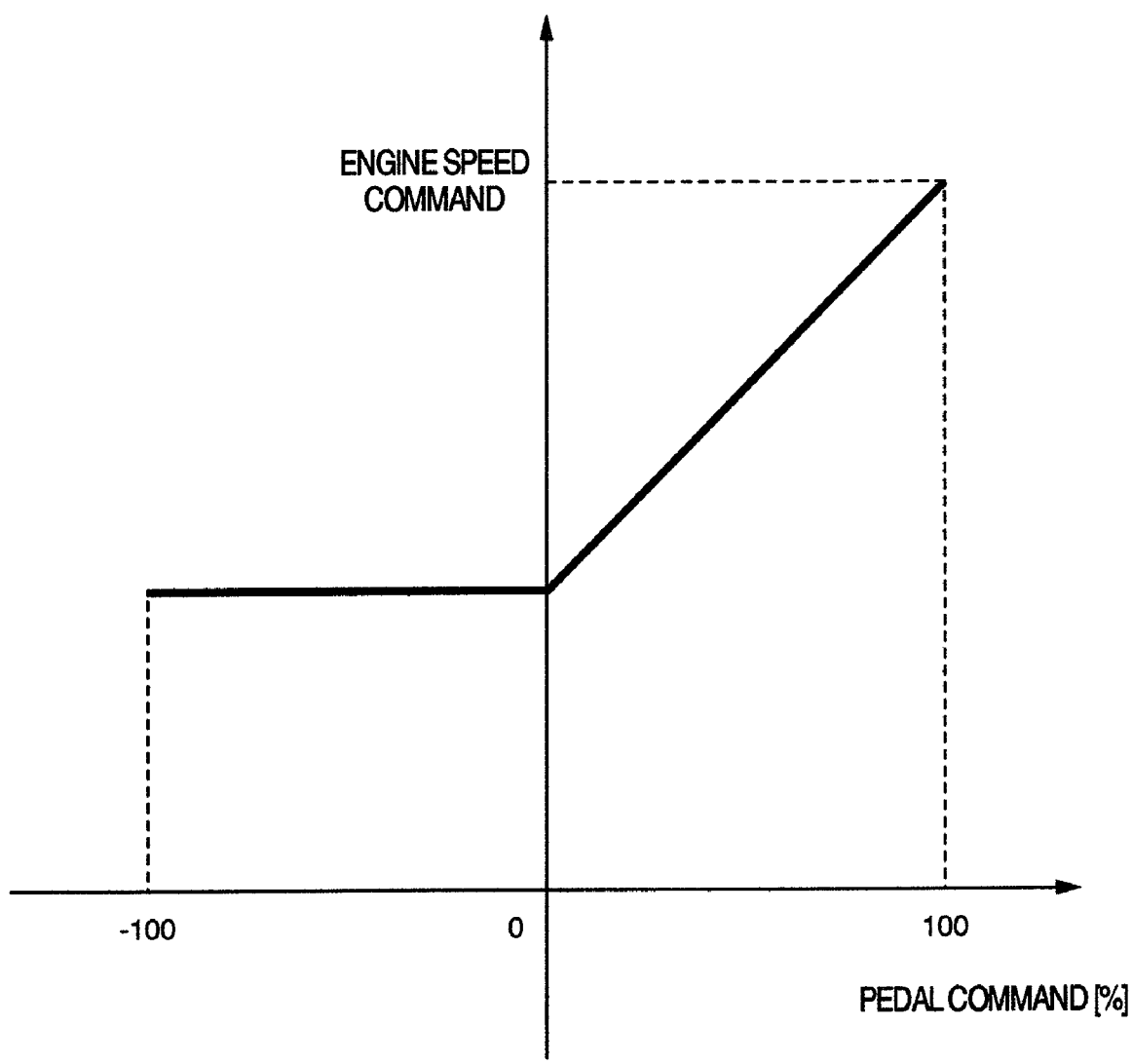
FIG. 2 graphically shows the relationship between the pedal command and the engine speed command, observed with the electric drive vehicle to which this invention is applied.

The operation of the engine speed command calculator 17 will then be described below. FIG. 2 graphically shows an example of the relationship between the pedal command and the engine speed command. In order to economize the fuel consumption in the engine 1, the engine speed command delivered from the engine speed command calculator 17 is varied in response to the pedal command delivered from the pedal actuation detector 16. This is because the engine 1 generally develops higher outputs as the rotational speed increases. To be concrete, when the pedal command takes a small positive value, that is, when the operator depresses the accelerator pedal to a small depth, the engine speed command is so set as to take a small value because the engine 1 has only to deliver a small output at that time. On the other hand, when the pedal command takes a large positive value, that is, when the operator depresses the accelerator pedal to a large depth, the engine speed command is so set as to take a large value because the engine 1 has to deliver a large output, then. When the pedal command takes a negative value, that is, when the operator is depressing the brake pedal, the engine speed command is so set as to take a small value because the engine 1 need not deliver any output.

Figure 3:
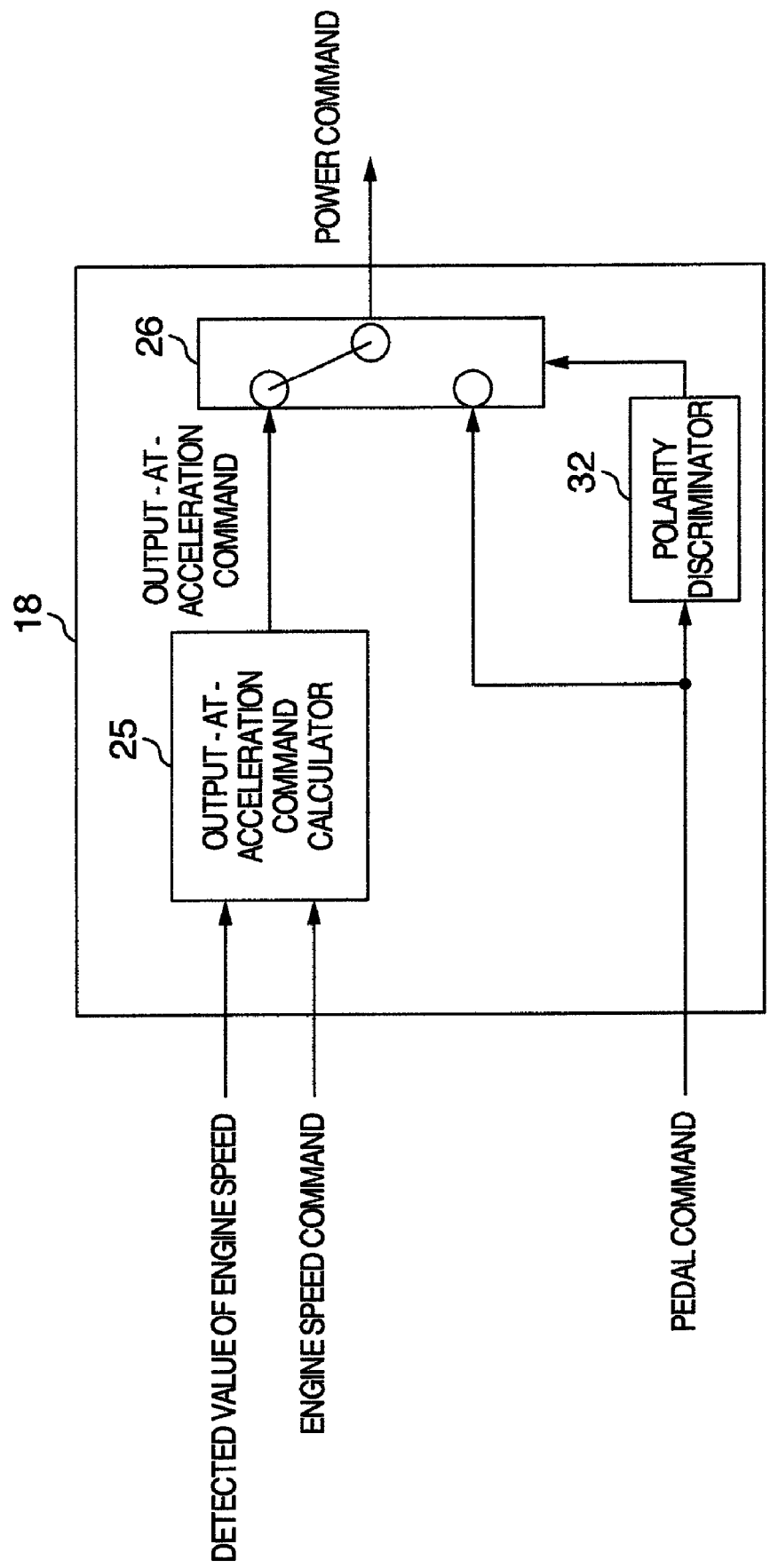
FIG. 3 shows in block diagram the configuration of a power command calculator used in the electric drive vehicle as the first embodiment of this invention.

The operation of the power command calculator 18 will now be described. FIG. 3 shows in block diagram the configuration of the power command calculator 18. An output-at-acceleration command calculator 25 receives input signals representing the detected value of engine speed delivered from the engine speed detector 3 and the engine speed command delivered from the engine speed command calculator 17, and outputs an output-at-acceleration command. A polarity discriminator 32 receives an input signal representing the pedal command delivered from the pedal actuation detector 16 and discriminates the polarity of the pedal command. A changeover switch 26 receives input signals representing the output-at-acceleration command delivered from the output-at-acceleration command calculator 25, the pedal command delivered from the pedal actuation detector 16 and the polarity discrimination value delivered from the polarity discriminator 32, and outputs the output-at-acceleration command delivered from the output-at-acceleration command calculator 25 as the corresponding power command when the polarity discrimination value delivered from the polarity discriminator 32 is positive. The changeover switch 26 also outputs the pedal command itself as the corresponding power command when the polarity discrimination value delivered from the polarity discriminator 32 is negative or zero. It is because the accelerations of both the engine 1 and the electric motor 8 must be taken into consideration that the pedal command delivered from the pedal actuation detector 16, if it takes a positive value, is not delivered as the corresponding power command. The detail of this situation will be described later.

Figure 4:
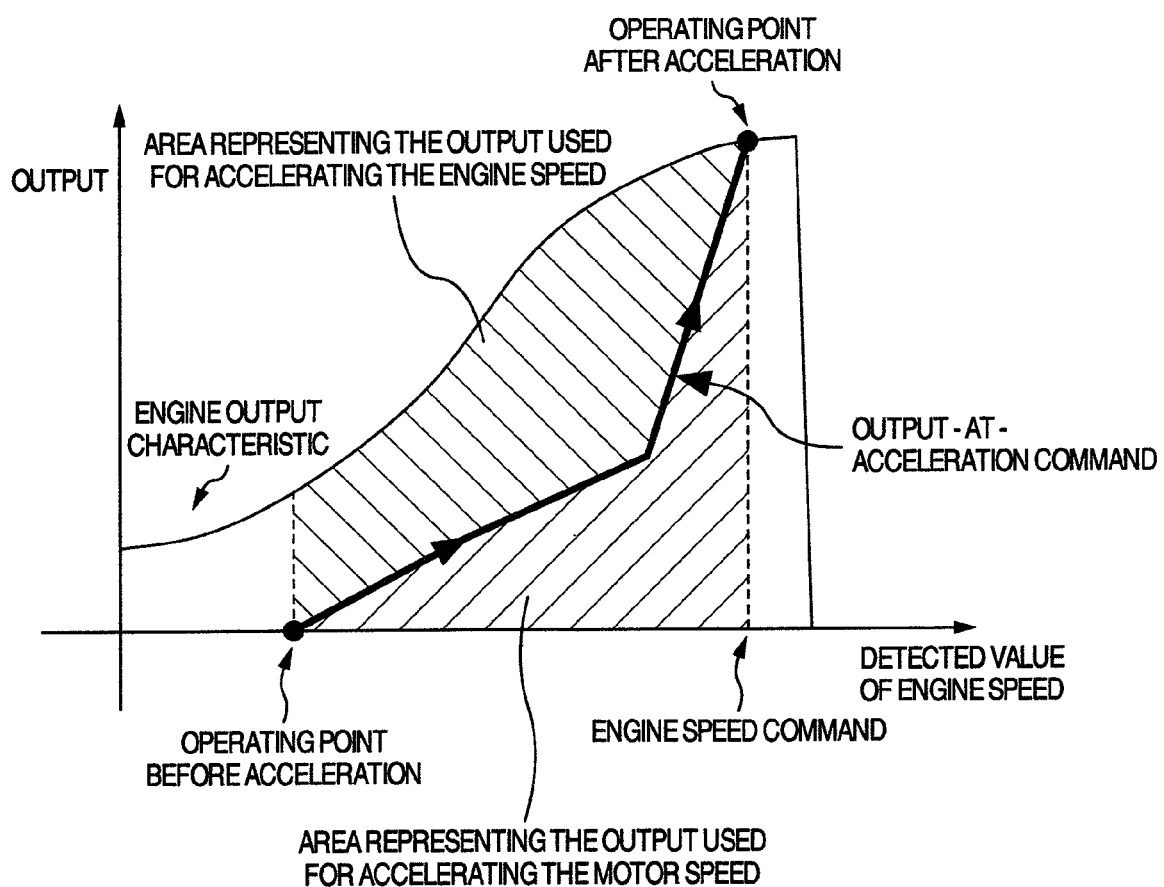
FIG. 4 graphically shows the relationship between the detected value of engine speed and the output-at-acceleration command, observed with the electric drive vehicle to which this invention is applied.

The operation of the output-at-acceleration command calculator 25 will now be described. FIG. 4 graphically shows the relationship between the detected value of engine speed and the output-at-acceleration command delivered from the output-at-acceleration command calculator 25 when the operator depresses the accelerator pedal. As shown in FIG. 4, the area defined between the engine output characteristic and the output-at-acceleration command represents the output of the engine 1 used for the acceleration of the engine 1, whereas the area defined between the output-at-acceleration command and the abscissa represents the output of the engine 1 used for the acceleration of the electric motor 8. Namely, the output-at-acceleration command is the command that determines how the output of the engine 1 is distributed for the accelerations of the engine 1 and the electric motor 8. The distribution needs the consideration of balance. For example, if the value of the output-at-acceleration command is increased, the output used for the acceleration of the engine 1 is decreased so that the increase in the engine speed is retarded. Consequently, the increase in the output used for the acceleration of the electric motor 8 is also retarded so that the acceleration of the vehicle may possibly be retarded. On the contrary, if the value of the output-at-acceleration command is decreased, the output used for the acceleration of the engine 1 is increased so that the increase of the engine speed is festinated. However, since the value of the output-at-acceleration command is decreased, the output used for the acceleration of the electric motor 8 is decreased so that there arises a possibility that the acceleration of the vehicle is retarded. Namely, it is important to determine the value of the output-at-acceleration command in such a manner that the acceleration of the engine 1 is compatible with that of the electric motor 8. Therefore, as shown in FIG. 4, in the area where the detected value of engine speed is small relative to the engine speed command, the acceleration of the engine 1 is promoted by making the output-at-acceleration command small so far as the acceleration of the electric motor 8 is not hindered. In the area where the detected value of engine speed is close to the engine speed command, the acceleration of the electric motor 8 is promoted by making the output-at-acceleration command large. With this operating characteristic described just above, the acceleration of the engine 1 can be made compatible with that of the electric motor 8.

If the engine output characteristic shown in FIG. 4 have been known, it is possible to determine, to a certain extent through calculation, that value of the output-at-acceleration command which makes the acceleration of the engine 1 compatible with that of the electric motor 8. In reality, however, such determination is difficult since there are many unclear points in the engine output characteristic. Difficulty further increases in consideration of the necessity that the transient engine output characteristic must be actually grasped since the engine speed will change, and of the possibility that the engine output characteristic may change due to the change in the ambient conditions such as atmospheric pressure and temperature or the deterioration of engine owing to aging. Therefore, it can be said that the determination of that value of the output-at-acceleration command which makes the acceleration of the engine 1 compatible with that of the electric motor 8, is difficult. In this situation, there are two methods for determining such a desired value of the output-at-acceleration command: one is to subject the vehicle to an actual drive test and the other is to simulate an actual drive test for the vehicle. These two methods will be described in the following.

Figure 5:
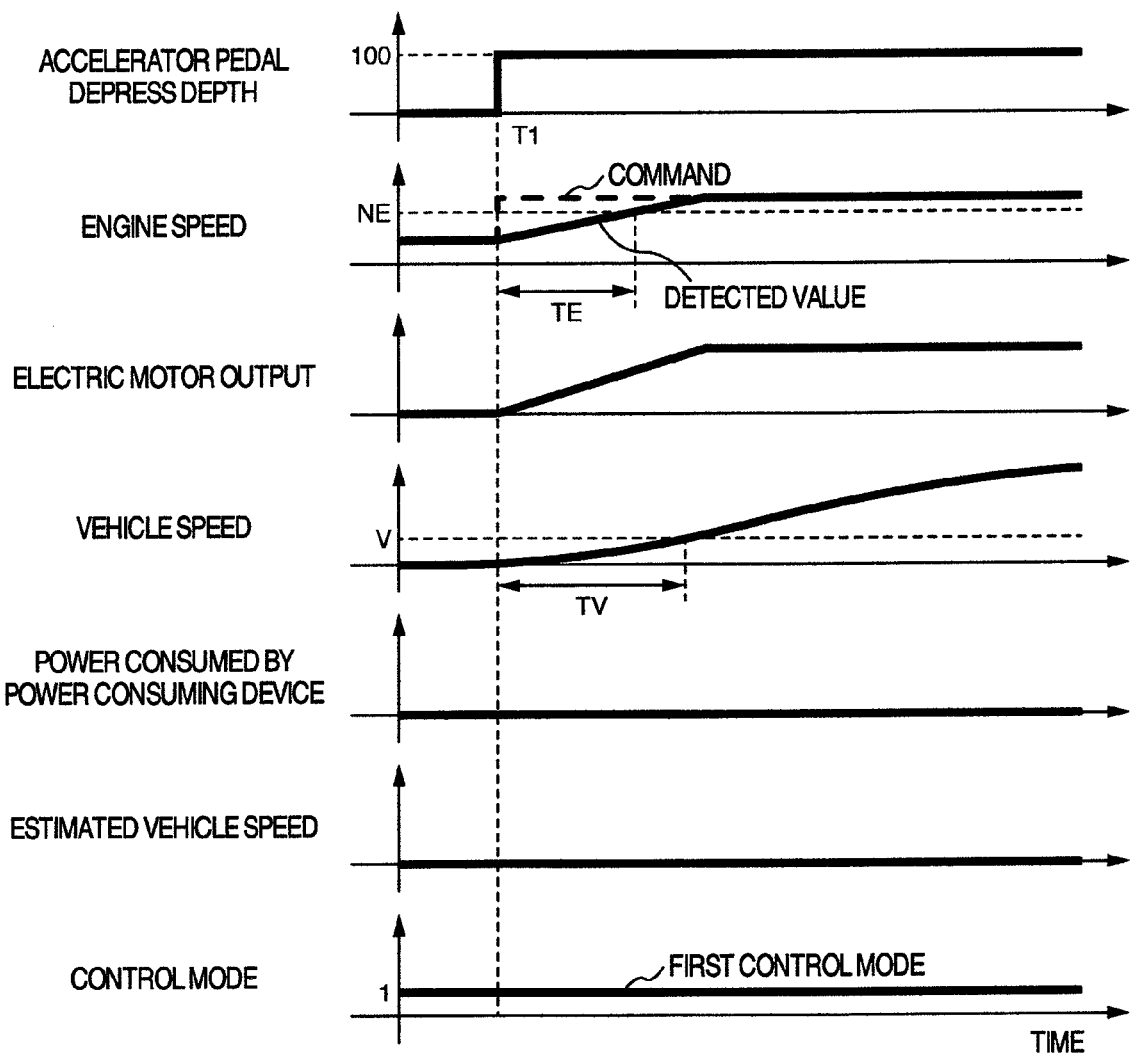
FIG. 5 graphically shows the operation of the electric drive vehicle to which this invention is applied, observed in the first control mode performed in the first embodiment of this invention.

First, the method will be described wherein the vehicle is subjected to an actual drive test to determine the desired value of the output-at-acceleration command. In this case, it is assumed that the control mode signal delivered from the control mode signal generator 19 represents the first control mode. FIG. 5 shows various waveforms which are important in describing this method. FIG. 5 specifically corresponds to the operation occurring when the operator depressed the acceleration pedal to the full depth at time T1 while the vehicle is at rest. In response to the operator's actuation of the accelerator pedal, the engine speed command delivered from the engine speed command calculator 17 increases so that the engine speed starts increasing gradually in accordance with the engine speed command. As the engine speed increases, the output-at-acceleration command delivered from the output-at-acceleration command calculator 25 increases as shown, for example, in FIG. 4, and this increasing output-at-acceleration command is delivered as the output of the power command calculator 18, i.e. the power command. When the control mode signal delivered from the control mode signal generator 19 represents the first control mode, the changeover switch 20 directs the power command delivered from the power command calculator 18 to the input of the torque command calculator 21. The torque command calculator 21 converts the inputted power command to the corresponding torque command, and outputs the torque command. The torque command then controls the electric motor 8 so that the output of the electric motor 8 follows the power command delivered from the power command calculator 18. As a result, the motor speed increases so that the vehicle speed also increases.

If the control mode signal delivered from the control mode signal generator 19 represents the first control mode, the power consumption controller 22 performs control in such a manner that the DC voltage across the DC circuit between the power converters 4 and 6 does not exceed a predetermined value. However, since the electric motor 8 does not perform regenerative operation while the operator is actuating the accelerator pedal, the DC voltage will not become so high as to exceed the predetermined value, and therefore the power consumption controller 22 will not operate specifically. Also, the vehicle speed estimator 24 will not operate if the control mode signal delivered from the control mode signal generator 19 represents the first control mode. Accordingly, the power consumed by the power consuming device 13 is zero, and therefore the estimated value of vehicle speed delivered from the vehicle speed estimator 24 is also zero.

As a result of the operations described above, the waveforms as shown in FIG. 5 are observed. In this case, the output-at-acceleration command shown in FIG. 4 is so adjusted that both the time TE required for the engine speed to increase up to a predetermined speed NE and the time TV required for the vehicle speed to increase up to a predetermined speed V fall within a predetermined range. By so doing, the acceleration of the engine 1 and that of the electric motor 8 can be made compatible with each other. According to this method, however, since the output-at-acceleration command must be adjusted by actually driving the vehicle, there is need for a test drive course. Labor and time is also required to actually drive the vehicle, leading to the prolongation of the test period.

Figure 6:
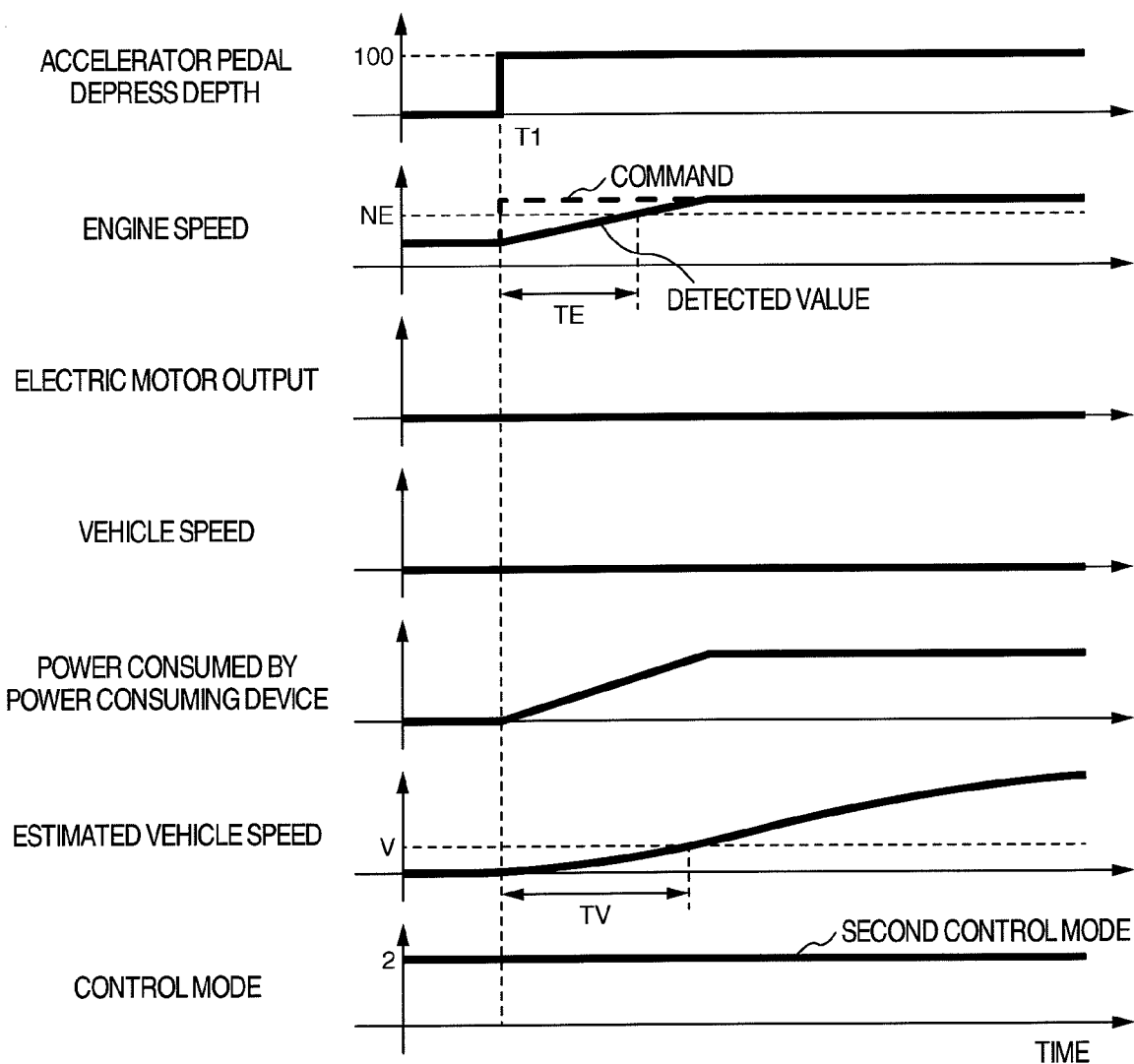
FIG. 6 graphically shows the operation of the electric drive vehicle to which this invention is applied, observed in the first control mode performed in the second embodiment of this invention.

Now, the method for determining the desired value for the output-at-acceleration command by simulating an actual vehicle test drive, will be described below. It is assumed here that the control mode signal delivered from the control mode signal generator 19 represents the second control mode. FIG. 6 shows various waveforms which are important in describing this method. FIG. 6 specifically corresponds to the operation occurring when the operator depressed the acceleration pedal to the full depth at time T1 while the vehicle is at rest. In response to the operator's actuation of the accelerator pedal, the engine speed command delivered from the engine speed command calculator 17 increases so that the engine speed starts increasing gradually in accordance with the engine speed command. As the engine speed increases, the output-at-acceleration command delivered from the output-at-acceleration command calculator 25 increases as shown, for example, in FIG. 4, and this increasing output-at-acceleration command is delivered as the output of the power command calculator 18, i.e. the power command. When the control mode signal delivered from the control mode signal generator 19 represents the second control mode, the changeover switch 20 directs the power command delivered from the power command calculator 18 to the input of the power consumption controller 22. Accordingly, the power consumed by the power consuming device 13 will follow the power command delivered from the power command calculator 18. If the control mode signal delivered from the control mode signal generator 19 represents the second control mode, the vehicle speed estimator 24 estimates the speed of the vehicle being driven in the first control mode by using the power command delivered from the power command calculator 18, and outputs the estimated vehicle speed.

On the other hand, if the control mode signal delivered from the control mode signal generator 19 represents the second control mode, the torque controller 23 does not deliver a gate pulse signal so that the operation of the power converter 6 can be stopped. Accordingly, the electric motor 8 continues to be at rest and the vehicle speed also remains zero.

As a result of the operations described above, the waveforms as shown in FIG. 6 are observed. In this case, the output-at-acceleration command is so adjusted as shown in FIG. 4 that both the time TE required for the engine speed to increase up to a predetermined speed NE and the time TV required for the estimated vehicle speed to increase up to a predetermined speed V fall within a predetermined range. By so doing, the accelerations of the engine 1 and the electric motor 8 adaptable for actual vehicle drive can be made compatible with each other without subjecting the vehicle to actual drive test. According to this method, since the output-at-acceleration command can be adjusted without subjecting the vehicle to actual test drive, there is no need for a test drive course. Labor and time to actually drive the vehicle can also be saved, leading to the reduction of the test period and the cost.

As described above, according to this embodiment, there is no need of test facility, and the measurement and adjustment of vehicle drive performance can be performed without actually driving the vehicle, so that the cost and the test period can be reduced and the efficiency of test can be improved. Further, since there is no need of test facility, frequent adjustments become possible and therefore the adjustment for performing the best operation continuously becomes possible.

Figure 7:
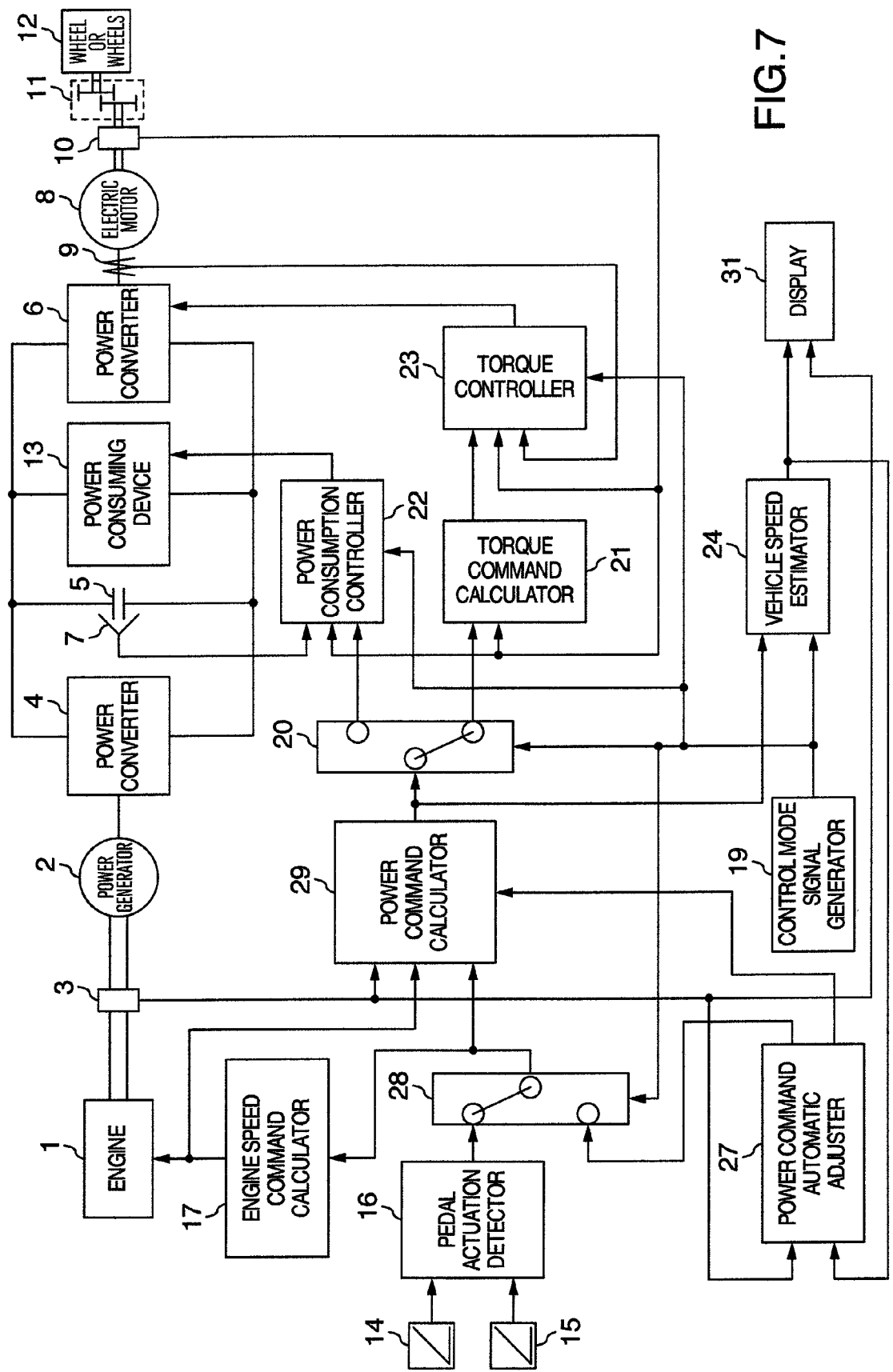
FIG. 7 shows in block diagram the configuration of an electric drive vehicle as a second embodiment of this invention.

FIG. 7 shows in block diagram the entire configuration of an electric drive vehicle as a second embodiment of this invention. This second embodiment differs from the first embodiment shown in FIG. 1 in that the former further comprises a power command automatic adjuster 27 and a changeover switch 28 and, as a result, that the output of the power command automatic adjuster 27 is additionally supplied to the input of the power command calculator 29. This difference makes it possible to automatically adjust the output-at-acceleration command shown in FIG. 4, though the detail will be described later.

The power command automatic adjuster 27 receives input signals representing the detected value of engine speed delivered from the engine speed detector 3 and the estimated vehicle speed delivered from the vehicle speed estimator 24, and outputs the pedal command to the changeover switch 28 in place of the pedal actuation detector 16. The power command automatic adjuster 27 also delivers a power command adjusting command to the power command calculator 29.

The changeover switch 28 receives input signals representing the pedal command delivered from the pedal actuation detector 16, the pedal command delivered from the power command automatic adjuster 27 and the control mode signal delivered from the control mode signal generator 19, and causes the pedal command delivered from the pedal actuation detector 16 to be the output of the changeover switch 28 when the control mode signal represents the first control mode, and the pedal command delivered from the power command automatic adjuster 27 to be the output of the changeover switch 28 when the control mode signal represents the second control mode.

The power command calculator 29 receives input signals representing the detected value of engine speed delivered from the engine speed detector 3, the engine speed command delivered from the engine speed command calculator 17, the pedal command delivered from the changeover switch 28 and the power command adjusting command delivered from the power command automatic adjuster 27, and outputs the power command to the electric motor 8 or the power consuming device 13.

Figure 8:
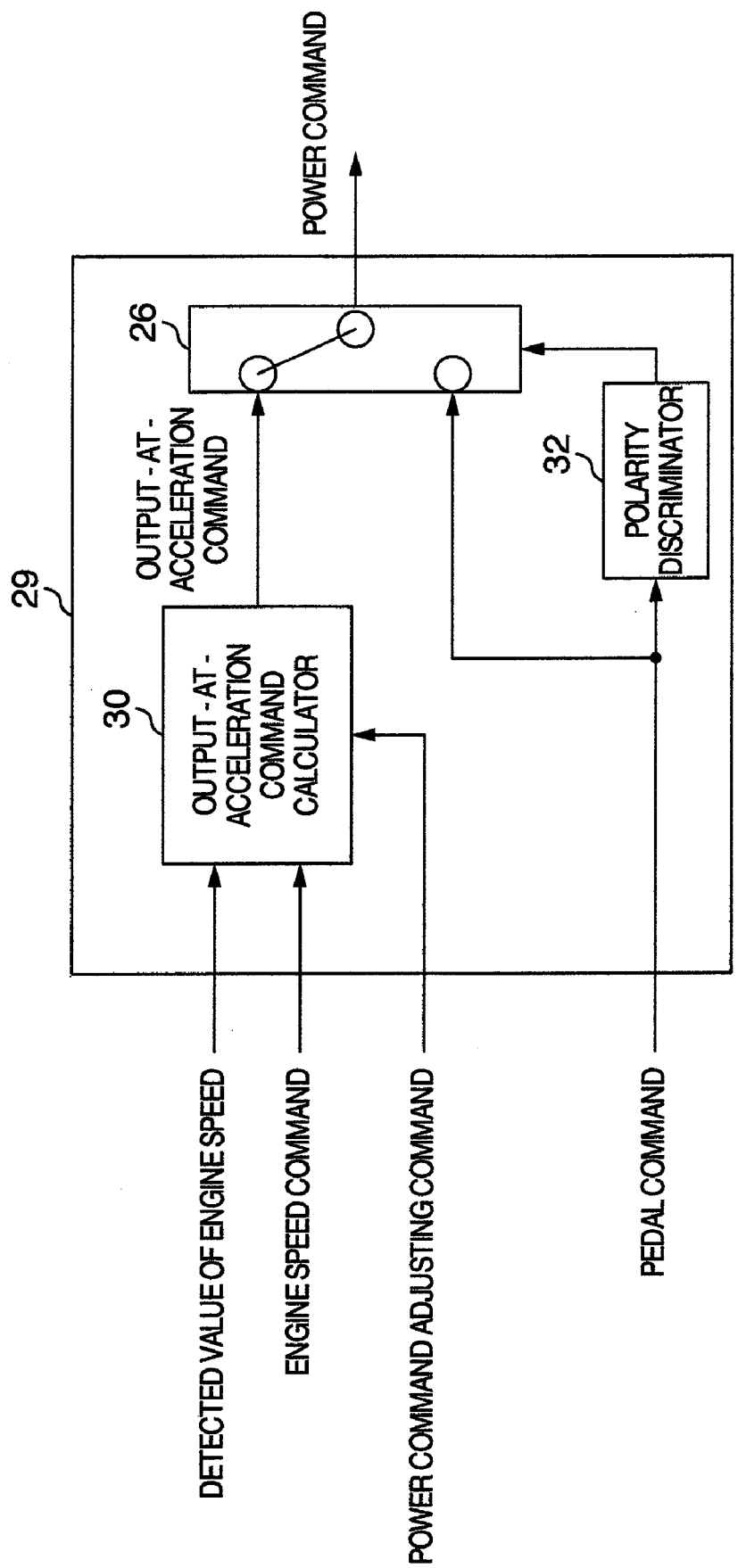
FIG. 8 shows in block diagram the configuration of a power command calculator used in the electric drive vehicle as the second embodiment of this invention.

FIG. 8 shows in block diagram the configuration of a power command calculator 29 used in the electric drive vehicle as the second embodiment of this invention. The power command calculator 29 shown in FIG. 8 has the same configuration as the power command calculator 18 shown in FIG. 3, unless otherwise mentioned specifically. The discernible difference is that the power command adjusting command delivered from the power command automatic adjuster 27 is supplied as an input to the output-at-acceleration command calculator 30.

Now, the operation of the electric drive vehicle as the second embodiment of this invention will be described below. It is assumed here that the control mode signal delivered from the control mode signal generator 19 represents the second control mode. FIG. 9 shows various waveforms which are important in describing this operation. FIG. 9 corresponds to the operation occurring when the power command automatic adjuster 27 delivers a pedal command at time T1 while the vehicle is at rest. When the power command automatic adjuster 27 delivers the pedal command, the engine speed command delivered from the engine speed command calculator 17 starts increasing in accordance with the pedal command. Accordingly, the speed of the engine 1 gradually increases in accordance with the engine speed command. As the engine speed increases, the output-at-acceleration command delivered from the output-at-acceleration command calculator 30 increases as shown in, for example, FIG. 4, so that the increased output-at-acceleration command is delivered as the output of the power command calculator 29, i.e. the power command. Since the control mode signal delivered from the control mode signal generator 19 was assumed above to be the second control mode, the changeover switch 20 selects the power command delivered from the power command calculator 29 as the input to the power consumption controller 22. Then, the power consumed by the power consuming device 13 will follow the power command delivered from the power command calculator 29. Also, when the control mode signal delivered from the control mode signal generator 19 represents the second control mode, the vehicle speed estimator 24 estimates the vehicle speed at which the vehicle is operated in the first control mode, by using the power command delivered from the power command calculator 29, and delivers the estimated vehicle speed.

When the control mode signal delivered from the control mode signal generator 19 represents the second control mode, the torque controller 23 does not deliver a gate pulse signal so as to stop the operation of the power converter 6. As a result, the electric motor 8 continues to be at rest so that the vehicle speed remains zero, too.

Then, after the speed of the engine 1 has increased sufficiently, the power command automatic adjuster 27 causes the pedal command delivered therefrom to be reduced to zero at time T2. In accordance with the pedal command of zero, the engine speed command delivered from the engine speed command calculator 17 decreases so that the speed of the engine 1 gradually decreases in accordance with the decreased engine speed command. At this time, the power command delivered from the power command calculator 29 is reduced to zero. Accordingly, the power consumed by the power consuming device 13 follows the zero power command delivered from the power command calculator 29 and therefore is reduced to zero. Also, at this time, the estimated vehicle speed delivered from the vehicle speed estimator 24 is reset to zero, and this state is maintained until the engine speed has been lowered completely in accordance with the engine speed command.

The power command automatic adjuster 27 estimates the duration TE1 required for the detected value of engine speed delivered from the engine speed detector 3 to increase up to a predetermined speed NE between time T1 and time T2, and the duration TV1 required for the estimated vehicle speed delivered from the vehicle speed estimator 24 to increase up to a predetermined vehicle speed V between time T1 and time T2, and checks whether each of the durations falls within a predetermined range. If either of these durations does not fall within the predetermined range, the power command automatic adjuster 27 adjusts the output-at-acceleration command shown in FIG. 4. Namely, in accordance with the power command adjusting command delivered from the power command automatic adjuster 27, the characteristic of the output-at-acceleration command delivered from the output-at-acceleration command calculator 30 shown in FIG. 8 is changed. For example, if the rate of increase in the engine speed is low, the output-at-acceleration command is made small so that the area, shown in FIG. 4, representing the output used for accelerating the engine speed can be increased. On the other hand, if the rate of increase in the estimated vehicle speed is low, the output-at-acceleration command is made large so that the area, shown in FIG. 4, representing the output used for accelerating the speed of the electric motor 8 can be increased. Thereafter, the power command automatic adjuster 27 delivers a pedal command again at time T3, and reduces the pedal command to zero at time T4. Concurrently, the power command automatic adjuster 27 estimates the duration TE2 required for the detected value of engine speed delivered from the engine speed detector 3 to increase up to a predetermined speed NE between time T3 and time T4, and the duration TV2 required for the estimated vehicle speed delivered from the vehicle speed estimator 24 to increase up to a predetermined vehicle speed V between time T3 and time T4, and checks again whether each of the durations falls within a predetermined range.

As described above, the power command automatic adjuster 27 continues to change the characteristic of the output-at-acceleration command shown in FIG. 4 until both the duration required for the detected engine speed delivered from the engine speed detector 3 to increase up to a predetermined value and the duration required for the estimated vehicle speed delivered from the vehicle speed estimator 24 to increase up to a predetermined value, have fallen within predetermined ranges. As a result, the output-at-acceleration command that can make the acceleration of the engine 1 and that of the electric motor 8 compatible with each other, can be automatically obtained, and the labor and time required for adjustment can be saved. Thus, the test period and the cost can both be reduced.

This invention can be applied to every type of electric drive vehicle that is driven by an electric motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric drive vehicle comprising:
a power generator coupled to an engine;
a first power converter connected with the power generator, for converting the AC power generated by the power generator to DC power;
a second power converter connected with the first power converter, for converting the DC power to AC power;
an electric motor connected with the second power converter;
at least one wheel driven by the electric motor; and
a power consuming device for consuming the DC power, connected to a DC circuit between the first and second power converters,
wherein the electric drive vehicle has a first control mode in which the electric drive vehicle is driven by controlling the output of the electric motor and a second control mode in which the power consumption by the power consuming device is controlled, and the second control mode performs such control as to cause the power consuming device to consume the amount of power that corresponds to the power consumed by both the second power converter and the electric motor in the first control mode.

2. An electric drive vehicle as claimed in claim 1, wherein if the electric drive vehicle is operated in the second control mode, the vehicle is not traveling.

3. An electric drive vehicle as claimed in claim 1, further comprising a vehicle speed estimator, wherein the vehicle speed estimator operates while the electric drive vehicle is operating in the second control mode, and estimates a speed of the electric drive vehicle virtually operating in the first control mode.

4. An electric drive vehicle as claimed in claim 1, further comprising a controller which controls the vehicle to be operated selectively in the first control mode or in the second control mode based on a mode signal.

5. An electric drive vehicle comprising:
a power generator coupled to an engine;
a first power converter connected with the power generator, for converting the AC power generated by the power generator to DC power;
a second power converter connected with the first power converter, for converting the DC power to AC power;
an electric motor connected with the second power converter;
at least one wheel driven by the electric motor;
a power consuming device for consuming the DC power, connected to a DC circuit between the first and second power converters; and
a power command calculator,
wherein the electric drive vehicle has a first control mode for controlling the output of the electric motor in accordance with the power command from the power command calculator and driving the electric drive vehicle, and a second control mode for controlling the power consumption by the power consuming device in accordance with the power command, are provided; and the second control mode performs such control as to cause the power consuming device to consume the amount of power that corresponds to the power consumed by both the second power converter and the electric motor in the first control mode.

6. An electric drive vehicle as claimed in claim 5, wherein the power command delivered from the power command calculator at the time of vehicle acceleration is expressed by a function of an engine speed and an engine speed command of the engine.

7. An electric drive vehicle as claimed in claim 5, wherein if the electric drive vehicle is operated in the second control mode, the vehicle is not traveling.

8. An electric drive vehicle as claimed in claim 5, further comprising a vehicle speed estimator, wherein the vehicle speed estimator operates while the electric drive vehicle is operating in the second control mode, and estimates a speed of the electric drive vehicle virtually operating in the first control mode.

9. An electric drive vehicle as claimed in claim 8, wherein while the electric drive vehicle is operating in the second control mode, the power command calculator automatically adjusts the power command in such a manner that each of a duration required for the engine speed to increase up to a predetermined value and a duration required for the estimated vehicle speed delivered from the vehicle speed estimator to increase up to a predetermined value, falls within a predetermined range.

10. An electric drive vehicle as claimed in claim 5, further comprising a vehicle speed estimator, wherein the vehicle speed estimator operates while the electric drive vehicle is operating in the second control mode, and estimates a speed of the electric drive vehicle virtually operating in the first control mode by using the power command delivered from the power command calculator.

11. An electric drive vehicle as claimed in claim 5, further comprising a controller which controls the vehicle to be operated selectively in the first control mode or in the second control mode based on a mode signal.

12. An electric drive system comprising:
an electric generator coupled to an engine;
a first power converter connected with the electric generator, for converting the AC power delivered from the electric generator to DC power;
a second power converter connected with the first power converter, for converting the DC power to AC power;
an electric motor connected with the second power converter; and
a power consuming device for consuming the DC power, connected to a DC circuit between the first and second power converters, the electric drive system having a function of performing a load test for the engine by controlling the power consumed by the power consuming device.

* * * * *